(12) United States Patent
Zhang

(10) Patent No.: US 12,115,611 B2
(45) Date of Patent: Oct. 15, 2024

(54) SELF-LOCKING LINEAR GUIDE RAIL CHANNEL DETECTION DEVICE

(71) Applicants: Lishui University, Lishui (CN); Zhejiang Wenyue Intelligent Technology Co., Ltd., Lishui (CN)

(72) Inventor: Ruihua Zhang, Lishui (CN)

(73) Assignees: Lishui University, Lishui (CN); Zhejiang Wenyue Intelligent Technology Co., Ltd., Lishui (CN)

( * ) Notice: Subject to any disclaimer, the term of this patent is extended or adjusted under 35 U.S.C. 154(b) by 268 days.

(21) Appl. No.: 17/873,570

(22) Filed: Jul. 26, 2022

(65) Prior Publication Data

US 2023/0066355 A1 Mar. 2, 2023

(30) Foreign Application Priority Data

Aug. 30, 2021 (CN) .......................... 202111003373.0

(51) Int. Cl.
| | |
|---|---|
| *B23Q 11/08* | (2006.01) |
| *B23Q 3/06* | (2006.01) |
| *F16C 29/00* | (2006.01) |
| *F16C 29/02* | (2006.01) |
| *F16C 29/08* | (2006.01) |

(Continued)

(52) U.S. Cl.
CPC ............... *B23Q 11/08* (2013.01); *B23Q 3/06* (2013.01); *F16C 29/004* (2013.01); *F16C 29/005* (2013.01); *F16C 29/02* (2013.01); *F16C 29/082* (2013.01); *G01M 13/00* (2013.01); *G01M 13/02* (2013.01)

(58) Field of Classification Search
CPC ......... B23Q 11/08; B23Q 3/06; F16C 29/082; F16C 29/005; F16C 29/02; F16C 29/004; G01M 13/02; G01M 13/00
See application file for complete search history.

(56) References Cited

U.S. PATENT DOCUMENTS

2020/0048006 A1 * 2/2020 Neufeld ................ B65G 39/09

FOREIGN PATENT DOCUMENTS

| CN | 205572018 | * | 9/2016 |
| CN | 217554872 | * | 10/2022 |
| CN | 117444537 | * | 1/2024 |

OTHER PUBLICATIONS

Translation of CN205572018.*

* cited by examiner

*Primary Examiner* — Helen C Kwok
(74) *Attorney, Agent, or Firm* — Jeenam Park

(57) ABSTRACT

The present application discloses a self-locking linear guide rail channel detection device, comprising: a detection platform for placing the guide rail to be detected; a detection device arranged on the detection platform; a conveying device connected with the detection device and is configured to push the detection device to slide horizontally along the detection platform; a locking device configured to fix the guide rail to be detected. In the present application, the guide rail to be detected is fixed on the placing platform by the vertical clamping mechanism and the side positioning and clamping mechanism, and a U-shaped groove linear motor drives the detection device to detect the channel of the linear guide rail, which greatly improves the detection accuracy and saves money. It reduces the labor cost; it is of great significance to promote the development of the bearing guide industry.

9 Claims, 8 Drawing Sheets

(51) Int. Cl.
*G01M 13/00* (2019.01)
*G01M 13/02* (2019.01)

SELF-LOCKING LINEAR GUIDE RAIL CHANNEL DETECTION DEVICE

CROSS-REFERENCE TO RELATED APPLICATIONS

This application claims priority to Chinese Application Serial No. 202111003373.0, filed on Aug. 30, 2021. The content of the aforementioned application, including any intervening amendments thereto, is incorporated herein by reference.

TECHNICAL FIELD

The application belongs to the technical field of guide rail detection, and in particular relates to a self-locking linear guide rail channel detection device.

BACKGROUND

With the development of the economy, the demand for guide rails has increased year by year. At present, most manufacturers conduct channel detection on the guide rails by manual sampling inspection. This detection method has large errors and high labor costs;

Before detecting the guide rail, the guide rail needs to be locked and fixed, and the conventional locking mechanism is not suitable for the guide rail with a certain length, and the simple manual locking method takes a long time, which seriously affects the production efficiency.

SUMMARY

The purpose of the present application is to provide a self-locking linear guide rail channel detection device to solve the above-mentioned problems in the background art.

To achieve the above purpose, the application provides the following technical solutions:

A self-locking linear guide rail channel detection device, comprising:
  a detection platform, configured to place the guide rail to be detected;
  a detection device, arranged on the detection platform;
  a conveying device connected with the detection device and is configured to push the detection device to slide horizontally along the detection platform;
  a locking device configured to fix the guide rail to be detected.

A middle part of the detection platform is provided with an installation groove, and a middle part of the installation groove is provided with a passage groove, a left and right sides of the passage groove are provided with line rails, and the line rails are fixedly connected with the installation groove; a placement platform is provided on both sides of the installation groove, and a placement slot is provided on the placement platform, and the lock device is arranged in the placement slot.

The placement slot comprises a first placement slot and a second placement slot, and the first placement slot is located between the second placement slot and the installation groove, a depth of the first placement slot is greater than a depth of the second placement slot, and a width of the second placement slot is configured to match a width of the guide rail to be detected.

A plurality of first through holes is arranged at equal intervals on the guide rail to be detected, and second through holes and third through holes are respectively arranged at positions corresponding to the first through holes on the first placement slot and the second placement slot.

The detection device comprises a moving platform, and a lower part of the moving platform is fixedly connected with the conveying device, and the conveying device is configured as a U-slot linear motor, and a left and right sides of the U-slot linear motor are provided with sliding blocks that match the linear rails, L-shaped mounting brackets are arranged on a left and right sides above the moving platform, a guide rail detection sensor is arranged under the L-shaped mounting bracket, a sliding groove matching a cross section of the guide rail to be detected is provided on the guide rail detection sensor, and a detection head is provided inside the sliding groove at a position corresponding to the channel of the guide rail to be detected.

The locking device comprises a vertical clamping mechanism and a side positioning clamping mechanism, and the vertical clamping mechanism is arranged in the third through hole, the side positioning and clamping mechanism is arranged in the second through hole, and a power device is arranged under the placing platform.

The vertical clamping mechanism comprises a first pull rod, a pull claw, an elastic ring, and a solenoid valve group, a necked section is provided at upper end of the first pull rod, the solenoid valve group is arranged at bottom of the necked section, a peaked support head is provided at upper end of the necked section, wherein a diameter of the peaked support head gradually increases from top to bottom, the diameter at lower end of the peaked support head is larger than a diameter of the necked section, a plurality of the pulling claws are provided and are arranged on outer side of the first pull rod, an arc-shaped groove is provided on outer side of a middle part of the pulling claw, and the elastic ring is configured to surround outer side of the pulling claw, and is located in the arc-shaped groove.

The pulling claw comprises a first L-shaped section, an inclined section and a second L-shaped section in sequence from bottom to top, and the arc-shaped groove is provided on outer side of the inclined section.

The side positioning and clamping mechanism comprises: a pressing block, and the pressing block is matched with the first placement slot, a cross section of the pressing block is configured to be a right-angled trapezoid, a second pull rod and an inclined installation hole are arranged under the pressing block, a spring is arranged in the installation hole, and a lower end of the spring is fixedly connected with a bottom surface of the first placement slot, a included angle between the spring and the bottom surface of the first placement slot is $\angle a$, a included angle between an inclined surface of the pressing block and the bottom surface of the placement slot is $\angle b$, and the $\angle a$ and $\angle b$ are both acute angles, and $\angle a = \angle b$, and the power device can drive the first pull rod and the second pull rod go up or down.

Both ends of the installation groove are configured to protrude from two ends of the placement platform, a front and rear ends of the installation groove are provided with stoppers, and dust covers are provided above the installation groove, the dust cover is a foldable dust cover, two of the dust covers are provided, wherein the opposite sides of the two dust covers are fixedly connected to the L-shaped mounting bracket.

The beneficial technical effect of the present application relative to the prior art is:

In the present application, the guide rail to be detected is fixed on the placing platform by the vertical clamping mechanism and the side positioning and clamping mechanism, and a U-shaped groove linear motor drives the detection device to detect the channel of the linear guide rail, which greatly improves the detection accuracy and saves money. It reduces the labor cost; it is of great significance to promote the development of the bearing guide industry.

Figure 1:
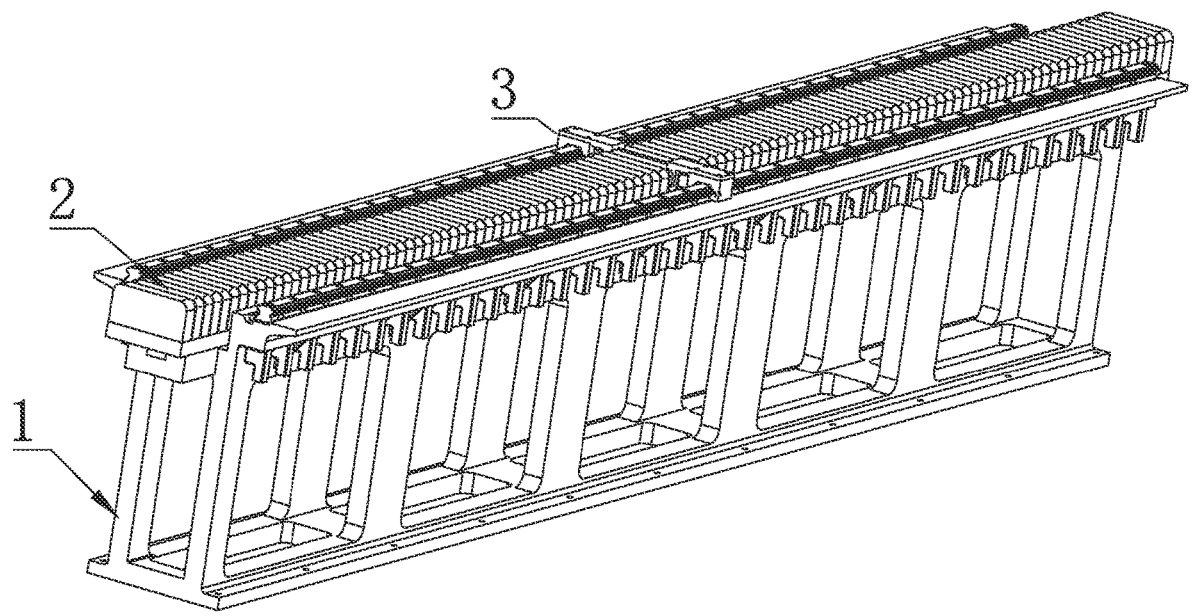
FIG. 1 is a perspective view of the present application.
Figure 2:
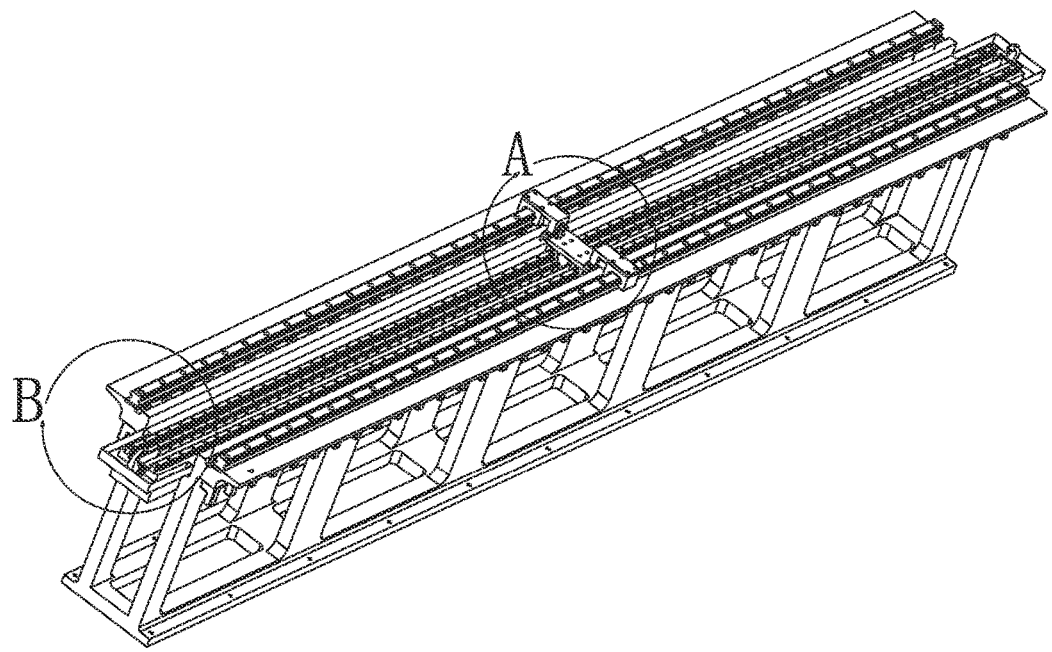
FIG. 2 is a perspective view of the present application after removing the dust cover.
Figure 3:
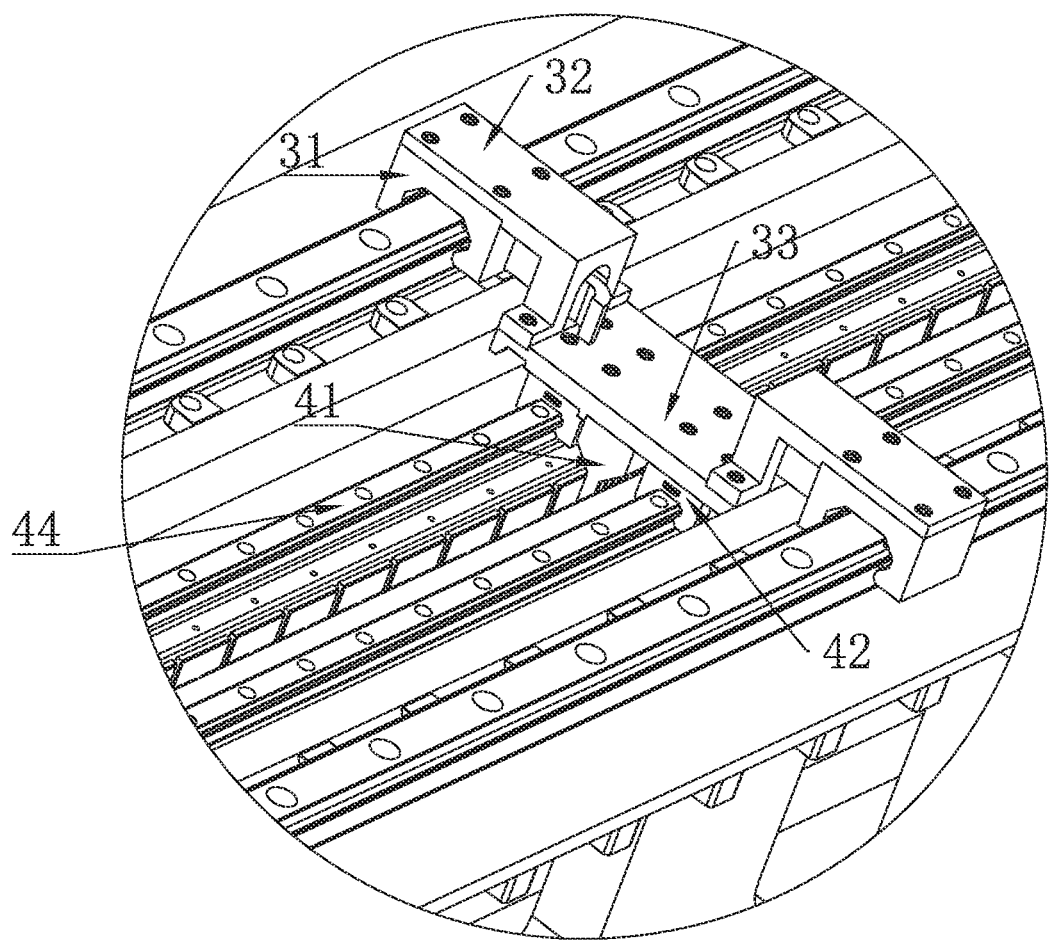
FIG. 3 is a partial enlarged view of area A in FIG. 2.
Figure 4:
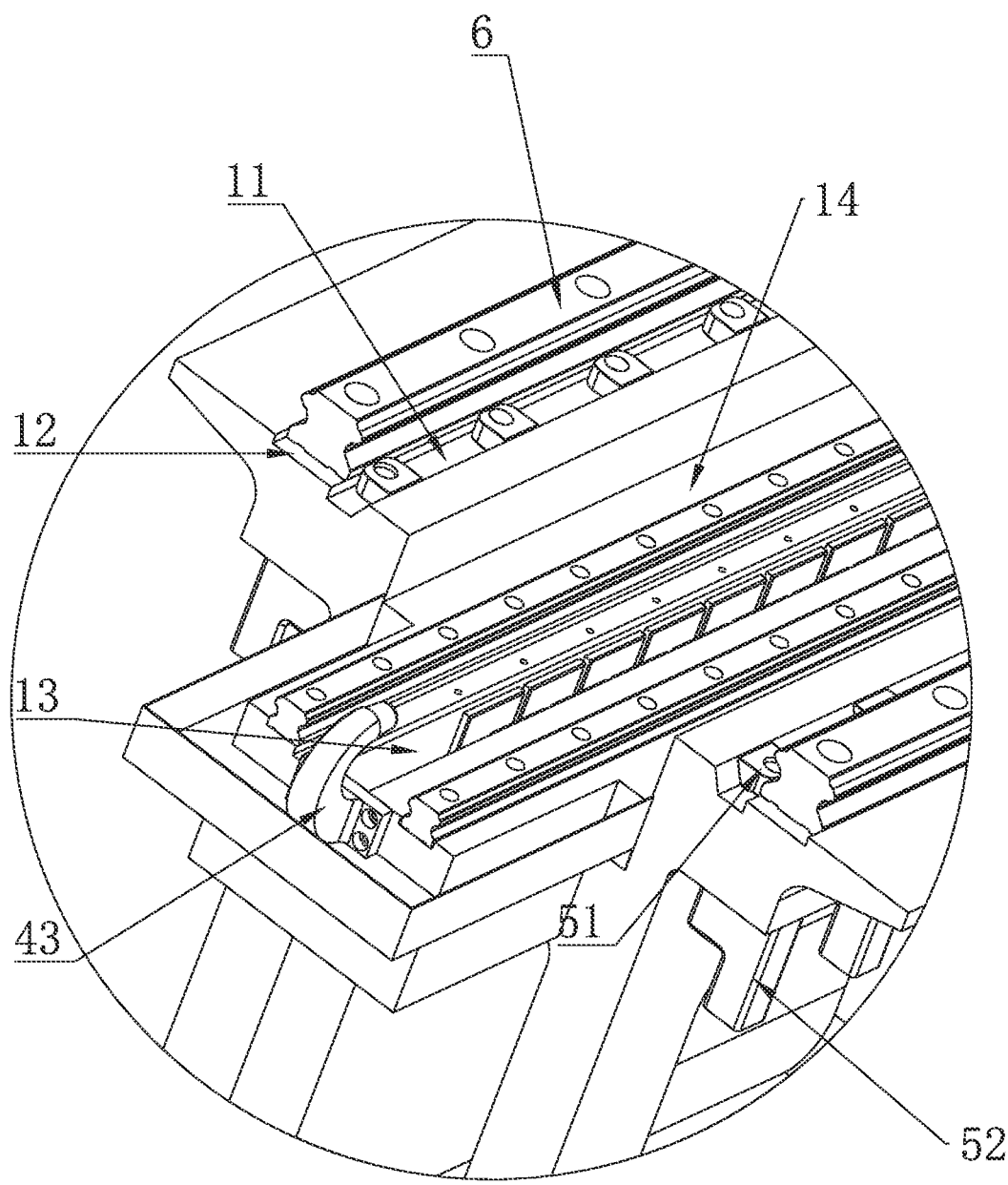
FIG. 4 is a partial enlarged view of region B in FIG. 2.
Figure 5:
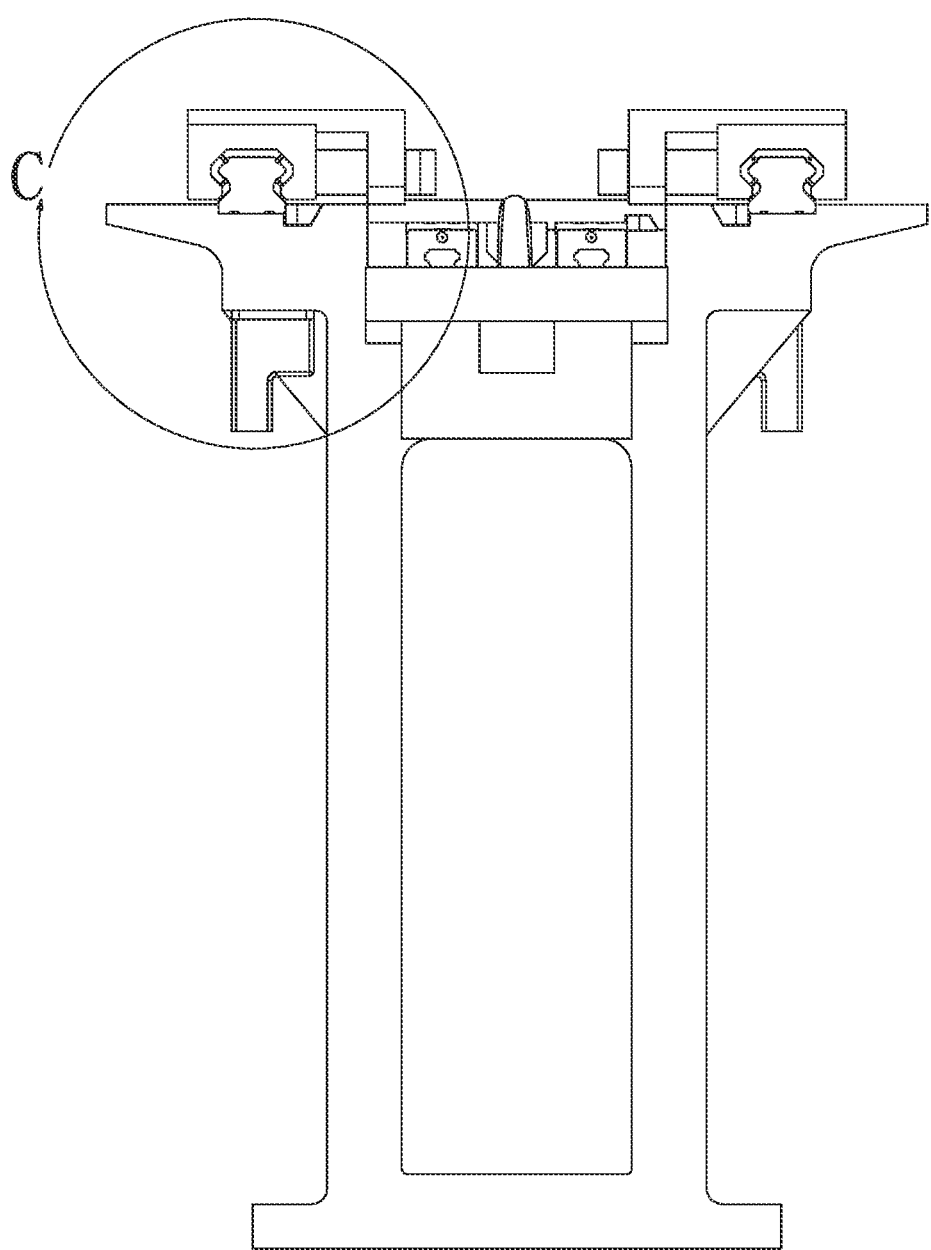
FIG. 5 is a left side view of the application after removing the dust cover.
Figure 6:
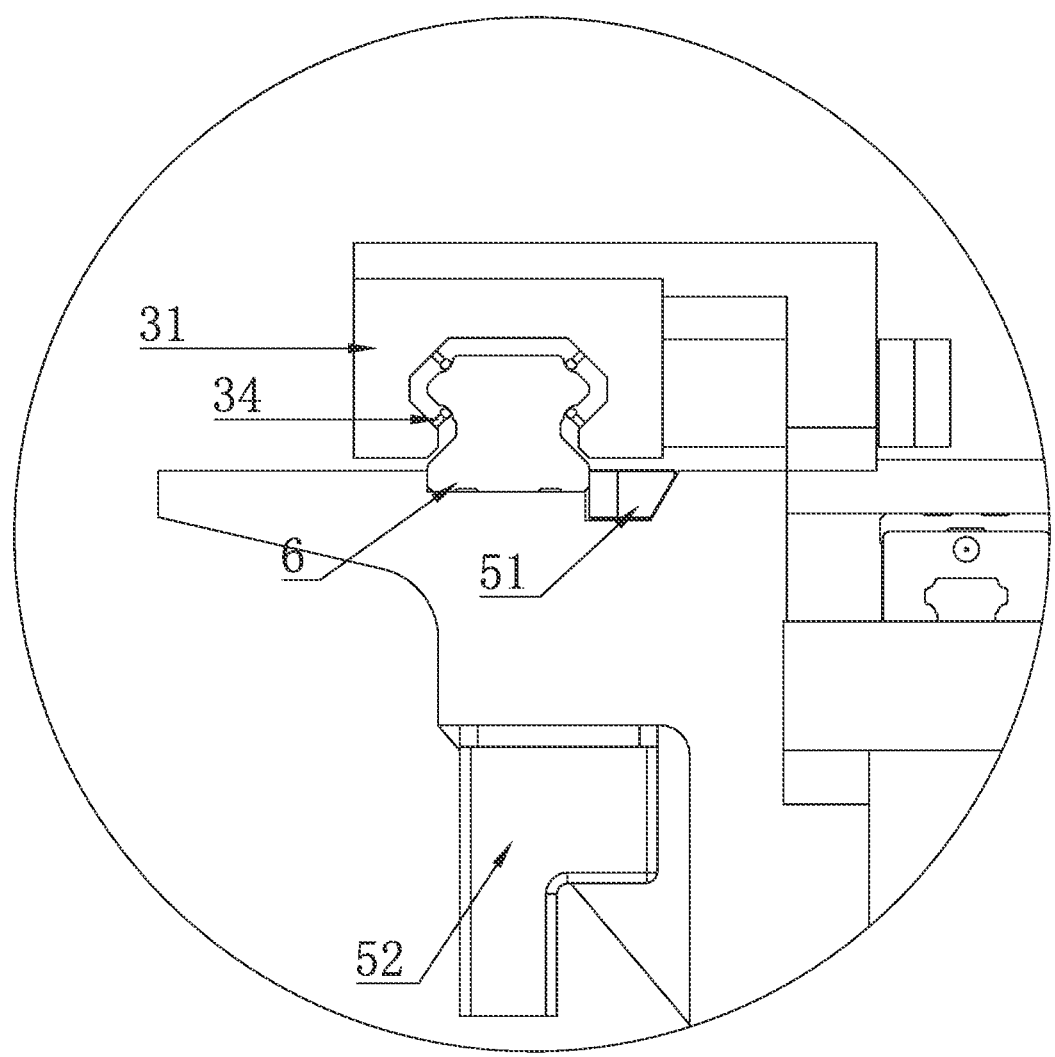
FIG. 6 is a partial enlarged view of FIG. 5.
Figure 7:
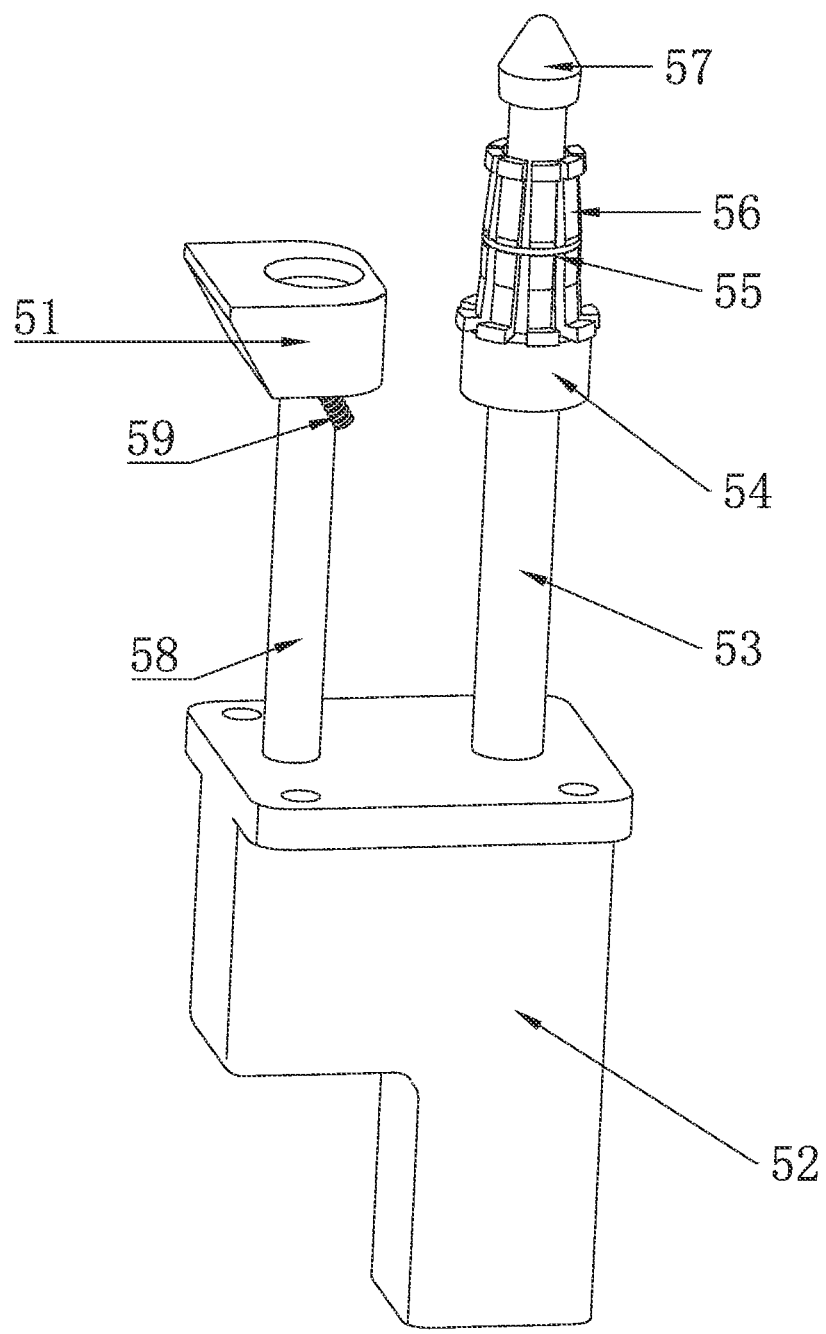
FIG. 7 is a perspective view of the locking device.

1. Detection platform; 11. First placement slot; 12. Second placement slot;
13. Passage groove; 14. Installation groove; 2. Dust cover; 3. Detection device;
31. Guide rail detection sensor; 32. L-shaped mounting brackets; 33. Moving platform;
34. Detection head; 41. U-slot linear motor; 42. Sliding block; 43. Stopper; 44. Line rail;
51. Pressing block; 52. Power unit; 53. First pull rod; 54. Solenoid valve group;
55. Elastic ring; 56. Pulling claw; 561. Second L-shaped section; 562. Inclined section;
564. First L-shaped section; 563. Arc groove; 57. Peaked support head;
58. Second pull rod; 59. Spring; 6. Guide rail to be detected.

DETAILED DESCRIPTION

The present application will be further described below with reference to the accompanying drawings and specific embodiments.

As shown in the figure, a self-locking linear guide rail channel detection device 3 comprises:
a detection platform 1, configured to place the guide rail to be detected 6; the detection platform 1 is a marble platform;
a detection device 3, arranged on the detection platform;
a conveying device connected with the detection device 3 and is configured to push the detection device 3 to slide horizontally along the detection platform;
a locking device configured to fix the guide rail to be detected 6.

A middle part of the detection platform 1 is provided with an installation groove 14, and a middle part of the installation groove 14 is provided with a passage groove 13, a left and right sides of the passage groove 13 are provided with line rails 44, and the line rails 44 are fixedly connected with the installation groove 14; a placement platform is provided on both sides of the installation groove 14, and a placement slot is provided on the placement platform, and the lock device is arranged in the placement slot.

The placement slot comprises a first placement slot 11 and a second placement slot 12, and the first placement slot 11 is located between the second placement slot 12 and the installation groove 14, a depth of the first placement slot 11 is greater than a depth of the second placement slot 12, and a width of the second placement slot 12 is configured to match a width of the guide rail to be detected 6.

A plurality of first through holes is arranged at equal intervals on the guide rail to be detected 6, and second through holes and third through holes are respectively arranged at positions corresponding to the first through holes on the first placement slot 11 and the second placement slot 12.

The detection device 3 comprises a moving platform 33, and a lower part of the moving platform 33 is fixedly connected with the conveying device, and the conveying device is configured as a U-slot linear motor 41, the U-shaped groove linear motor 41 is slidably connected with the passage groove 13, and a left and right sides of the U-slot linear motor 41 are provided with sliding blocks 42 that match the linear rails, L-shaped mounting brackets 32 are arranged on a left and right sides above the moving platform 33, a guide rail detection sensor 31 is arranged under the L-shaped mounting bracket 32, a sliding groove matching a cross section of the guide rail to be detected 6 is provided on the guide rail detection sensor 31, and a detection head 34 is provided inside the sliding groove at a position corresponding to the channel of the guide rail to be detected 6.

The U-slot linear motor 41 is used to drive the detection device 3 to move linearly; the line rail 44 and the sliding blocks 42 are used to guide the U-slot linear motor 41.

The locking device comprises a vertical clamping mechanism and a side positioning clamping mechanism and the vertical clamping mechanism is arranged in the third through hole, the side positioning and clamping mechanism is arranged in the second through hole, and a power device 52 is arranged under the placing platform.

The vertical clamping mechanism comprises a first pull rod 53, pull claws 56, an elastic ring 55, and a solenoid valve group 54, a necked section is provided at upper end of the first pull rod 53, the solenoid valve group 54 is arranged at bottom of the necked section, a peaked support head 57 is provided at upper end of the necked section, wherein a diameter of the peaked support head 57 gradually increases from top to bottom, the diameter at lower end of the peaked support head 57 is larger than a diameter of the necked section, a plurality of the pulling claws 56 are provided and are arranged on outer side of the first pull rod 53, an arc-shaped groove 563 is provided on outer side of a middle part of the pulling claw 56, and the elastic ring 55 is configured to surround outer side of the pulling claw 56, and is located in the arc-shaped groove 563.

The pulling claw 56 comprises a first L-shaped section 564, an inclined section 562 and a second L-shaped section 561 in sequence from bottom to top, and the arc-shaped groove 563 is provided on outer side of the inclined section 562.

Before detection, the vertical clamping mechanism is inserted into the first through hole of the guide rail to be detected from below. At this time, the pulling claw 56 is in a retracted state under the action of the elastic ring 55. Then, the solenoid valve group 54 works to open the pulling claw 56, and the horizontal section on the second L-shaped section 561 is stuck on the upper surface of the guide rail to be detected. Then the power device 52 controls the first pull rod 53 to go down so that it supports the pull claw 56 outwardly from the inside, and then vertically preloads the guide rail to be detected 6. The horizontally opposite surfaces of the first L-shaped section 564 and the second L-shaped section 561 are also pressed against the upper and lower surfaces of the guide rail to be detected 6.

After the detection is completed, the power device 52 controls the first pull rod 53 to go up. Since the first L-shaped section 564 on the first pull claw 56 is in close contact with the guide rai to be detected 6, the pulling claw 56 will not go up simultaneously with the first pulling rod 53. Therefore, with the rise of the first pull rod 53, under the action of the elastic ring 55, the pull claw 56 is closed. Then, the first pull rod 53 is driven to go down again, so that the vertical clamping mechanism can be retracted into the third through hole, so far, the vertical preload on the first through hole is released.

By adjusting the down moving range of the first pull rod 53, the opening range of the pull claw 56 can be changed, thereby adjusting the pre-tightening force of the guide rail to be detected.

The side positioning and clamping mechanism comprises: a pressing block 51, and the pressing block 51 is matched with the first placement slot 11, a cross section of the pressing block 51 is configured to be a right-angled trapezoid, a second pull rod 58 and an inclined installation hole are arranged under the pressing block 51, a spring 59 is arranged in the installation hole, and a lower end of the spring 59 is fixedly connected with a bottom surface of the first placement slot 11, a included angle between the spring 59 and the bottom surface of the first placement slot 11 is ∠a, a included angle between an inclined surface of the pressing block 51 and the bottom surface of the placement slot is ∠b, and the ∠a and ∠b are both acute angles, and ∠a=∠b, and the power device 52 can drive the first pull rod 53 and the second pull rod 68 go up or down.

Figure 8:
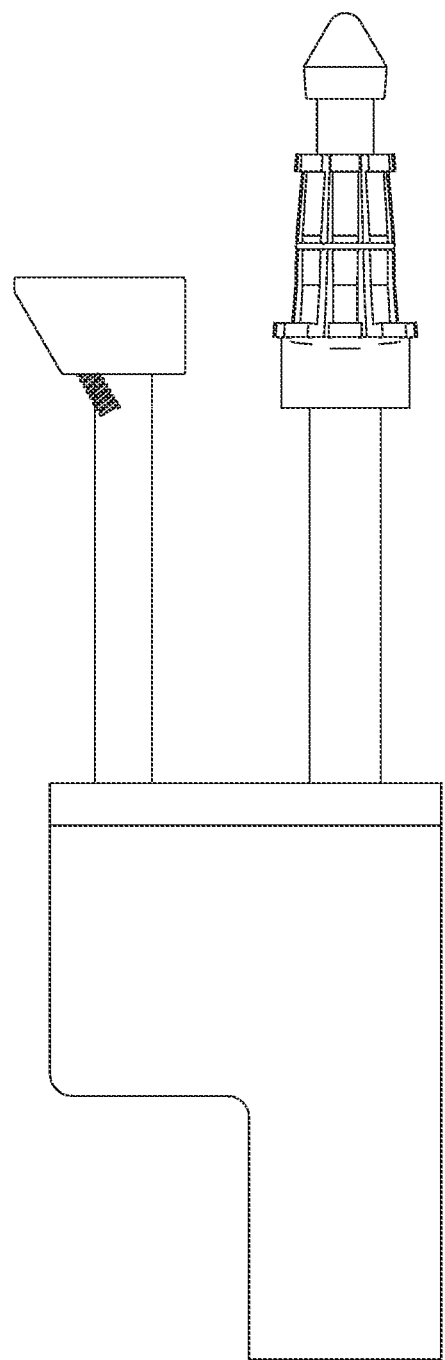
FIG. 8 is a front view of the locking device.
Figure 9:
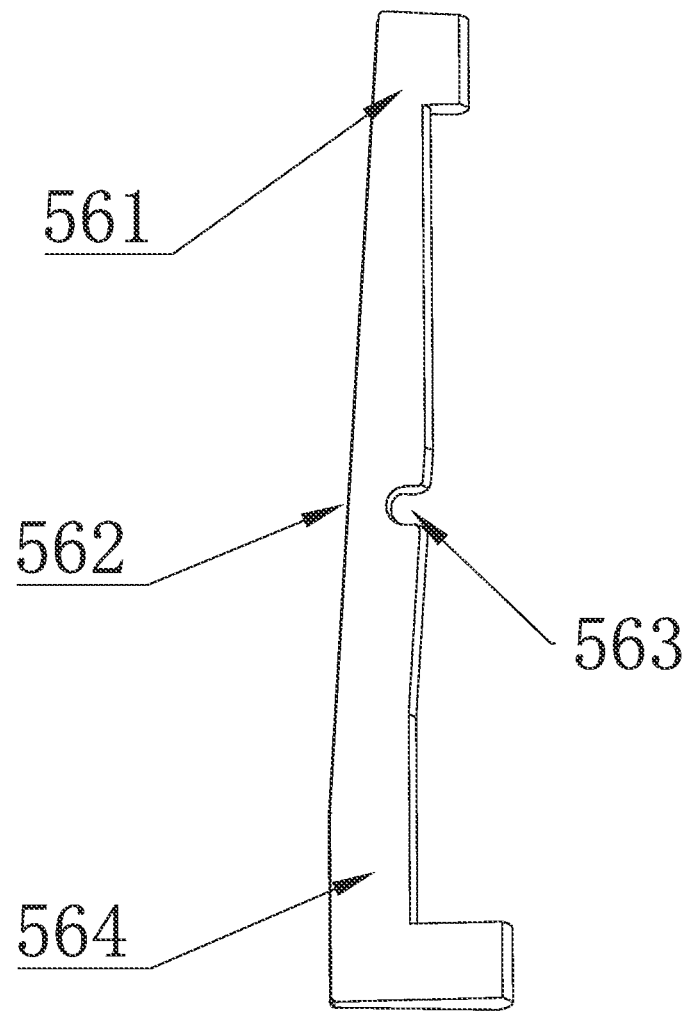
FIG. 9 is a side view of the pull claw.

As shown in FIG. 8: the installation hole is located close to the inclined surface of the pressing block 51; the spring 59 is parallel to the inclined surface of the pressing block 51.

The second pull rod 58 is controlled by the power device 52 to go down. When the pressing block 51 tends to abut against the first placement slot 11, the spring 59 is compressed, and the side of the pressing blocks 51 that is close to the inclined surface is lifted upwards. Therefore, the side surface of the pressing block 51 opposite to the inclined surface can be pressed against the side surface of the guide rail to be detected 6. When the detection is completed, the second pull rod 58 is controlled by the power device 52 to go up, and as the pressing block 51 goes up, the spring 59 changes from a compressed state to a tensioned state. When the lower surface of the pressing block 51 is separated from the upper edge of the first placement slot 11, the spring 59 applies elastic force to the lower surface of the pressing block 51, so that the pressing block 51 is inclined. Therefore, the pressing force between the side surface of the pressing block 51 opposite to the rail to be detected and the rail to be detected can be released.

Both ends of the installation groove 14 are configured to protrude from two ends of the placement platform, a front and rear ends of the installation groove 14 are provided with stoppers 43, and dust covers 2 are provided above the installation groove 14, the cross section of the dust cover 2 is an inverted U-shaped structure, the dust cover 2 is a foldable dust cover, two of the dust covers 2 are provided, wherein the opposite sides of the two dust covers 2 are fixedly connected to the L-shaped mounting bracket 32.

The detection device 3 is moved from one end of the installation groove 14 to the other end of the installation groove 14. Since both ends of the installation groove 14 protrude from the two ends of the placement platform, the guide rail to be detected 6 placed on the placement platform can be fully detected. When the detection device 3 moves, one of the two folded dust covers 2 located on both sides of the detection device 3 is compressed and the other is stretched, so as to prevent the conveying device from being contaminated with dust.

In the present application, the guide rail 6 to be detected is fixed on the placing platform through the vertical clamping mechanism and the side positioning and clamping mechanism, and the U-shaped groove linear motor drives the detection device 3 to detect the channel of the linear guide rail, which greatly improves the detection accuracy. It also saves labor costs; it is of great significance to promote the development of the bearing guide industry.

The above are only the preferred embodiments of the present application, and are not intended to limit the present application. Therefore, any modification, equivalent replacement, improvement, etc. made to the above embodiments according to the technical practice of the present application still fall within the scope of the technical solution of the present application.

What is claimed is:

1. A self-locking linear guide rail channel detection device, comprising:
   a detection platform, configured to place the guide rail to be detected;
   a detection device, arranged on the detection platform;
   a conveying device connected with the detection device and configured to push the detection device to slide horizontally along the detection platform;
   a locking device configured to fix the guide rail to be detected;
   wherein a middle part of the detection platform is provided with an installation groove, and a middle part of the installation groove is provided with a passage groove, a left and right sides of the passage groove are provided with line rails, and the line rails are fixedly connected with the installation groove; a placement platform is provided on both sides of the installation groove, and a placement slot is provided on the placement platform, and the locking device is arranged in the placement slot.

2. The self-locking linear guide rail channel detection device according to claim 1, wherein the placement slot comprises a first placement slot and a second placement slot, and the first placement slot is located between the second placement slot and the installation groove, a depth of the first placement slot is greater than a depth of the second placement slot, and a width of the second placement slot is configured to match a width of the guide rail to be detected.

3. The self-locking linear guide rail channel detection device according to claim 2, wherein a plurality of first through holes are arranged at equal intervals on the guide rail to be detected, and second through holes and third through holes are respectively arranged at positions corresponding to the first through holes on the first placement slot and the second placement slot.

4. The self-locking linear guide rail channel detection device according to claim 3, wherein the detection device comprises a moving platform, and a lower part of the moving platform is fixedly connected with the conveying device, and the conveying device is configured as a U-slot linear motor, and a left and right sides of the U-slot linear motor are provided with sliding blocks that match the line rails, L-shaped mounting brackets are arranged on a left and right sides above the moving platform, a guide rail detection sensor is arranged under the L-shaped mounting brackets, a sliding groove matching a cross section of the guide rail to be detected is provided on the guide rail detection sensor, and a detection head is provided inside the sliding groove at a position corresponding to the channel of the guide rail to be detected.

5. The self-locking linear guide rail channel detection device according to claim 4, wherein the locking device comprises a vertical clamping mechanism and a side positioning and clamping mechanism, and the vertical clamping mechanism is arranged in the third through holes, the side positioning and clamping mechanism is arranged in the second through holes, and a power device is arranged under the placement platform.

6. The self-locking linear guide rail channel detection device according to claim 5, wherein the vertical clamping mechanism comprises a first pull rod, pulling claws, an elastic ring, and a solenoid valve group, a necked section is provided at an upper end of the first pull rod, the solenoid valve group is arranged at a bottom of the necked section, a peaked support head is provided at an upper end of the necked section, wherein a diameter of the peaked support head gradually increases from top to bottom, the diameter at a lower end of the peaked support head is larger than a diameter of the necked section, a plurality of the pulling claws are provided and are arranged on an outer side of the first pull rod, an arc-shaped groove is provided on an outer side of a middle part of the pulling claws, and the elastic ring is configured to surround an outer side of the pulling claws, and is located in the arc-shaped groove.

7. The self-locking linear guide rail channel detection device according to claim 6, wherein the pulling claws comprise a first L-shaped section, an inclined section and a second L-shaped section in sequence from bottom to top, and the arc-shaped groove is provided on an outer side of the inclined section.

8. The self-locking linear guide rail channel detection device according to claim 7, wherein the side positioning and clamping mechanism comprises: a pressing block, and the pressing block is matched with the first placement slot, a cross section of the pressing block is configured to be a right-angled trapezoid, a second pull rod and an inclined installation hole are arranged under the pressing block, a spring is arranged in the inclined installation hole, and a lower end of the spring is fixedly connected with a bottom surface of the first placement slot, an included angle between the spring and the bottom surface of the first placement slot is ∠a, an included angle between an inclined surface of the pressing block and a bottom surface of the placement slot is ∠b, and the ∠a and ∠b are both acute angles, and ∠a=∠b, and the power device can drive the first pull rod and the second pull rod go up or down.

9. The self-locking linear guide rail channel detection device according to claim 8, wherein both ends of the installation groove are configured to protrude from two ends of the placement platform, a front and rear ends of the installation groove are provided with stoppers, and dust covers are provided above the installation groove, the dust covers are foldable dust covers, two of the dust covers are provided, wherein the opposite sides of the two dust covers are fixedly connected to the L-shaped mounting brackets.

* * * * *